United States Patent [19]
Wakerly

[11] Patent Number: 4,680,779
[45] Date of Patent: Jul. 14, 1987

[54] DISTRIBUTED CLOCK SYNCHRONIZATION IN A DIGITAL DATA SWITCHING SYSTEM

[75] Inventor: John F. Wakerly, Mountain View, Calif.

[73] Assignee: David Systems, Inc., Sunnyvale, Calif.

[21] Appl. No.: 692,006

[22] Filed: Jan. 14, 1985

[51] Int. Cl.$^4$ .............................................. H04L 7/00
[52] U.S. Cl. ..................................... 375/107; 328/72; 328/155; 370/103; 331/1 A
[58] Field of Search .............. 375/107, 119, 120, 118; 370/100, 103; 331/1 A; 328/72, 155, 133; 377/47, 48, 50; 307/525, 526, 527, 528; 455/51, 69

[56] References Cited

U.S. PATENT DOCUMENTS

3,629,506 12/1971 Brun ....................................... 455/51
3,988,696 10/1976 Sharpe ................................. 375/120
4,231,114 10/1980 Dolikian ............................. 375/107

Primary Examiner—Robert L. Griffin
Assistant Examiner—M. Huseman
Attorney, Agent, or Firm—Townsend and Townsend

[57] ABSTRACT

A clock synchronization system in a digital data switching system, such as a digital PBX. The system has a local clock generating timing signals at a frequency greater than a nominal frequency, a circuit for lowering the local clock frequency and a comparator coupled to a second clock operating substantially at the nominal frequency for activating the lowering circuit so that the local clock is synchronized with the second clock. The system is distributed by placing the local clock and the lowering frequency on the control module of the switching system and placing the comparator to one or more of the line card modules which is receiving the second clock signals. Communication between the comparator and lowering circuit may be over a single line.

14 Claims, 6 Drawing Figures

DISTRIBUTED CLOCK SYNCHRONIZATION IN A DIGITAL DATA SWITCHING SYSTEM

FIELD OF THE INVENTION

The present invention relates to a private branch exchange (PBX) in the field of digital telephony and, more particularly, to clock synchronization in a digital data switching system.

BACKGROUND OF THE INVENTION

PBXs are increasingly being used in present day telephone systems. A PBX system ties together the telephones of an office, building or factory. Anyone within the PBX system can talk to someone else within the system without the cost and time of using outside lines and facilities.

Increasingly, PBX systems are becoming digital. The analog voice signals of a caller are converted into a digital representation. These digital signals are transmitted through the PBX system. Furthermore, PBX systems are increasingly used to transport computer data signals. This is due, in part, to the availability of personal computers in the home and office.

Figure 1:
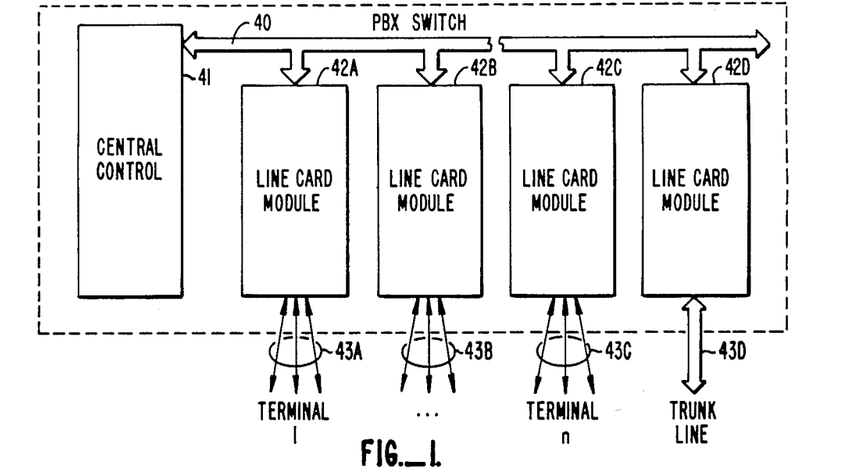
FIG. 1 is a generalized diagram of a PBX switch.

The heart of the system, the PBX switch as shown in FIG. 1, connects callers within the system, connects callers to outside lines if a call outside the PBX system is desired, and connects outside callers to lines within the system. A PBX switch generally has a number of modules or "line cards." Each line card is connected to a number of telephones or "terminals" and the line cards are connected to each other by a set of lines called a "bus", or sometimes, the "backplane bus." The bus, such as bus 40 in FIG. 1, has a timeslot bus. The timeslot bus carries the digital signals of a voice or the data of a computer, for example.

In a digital PBX, the voice signals are sampled at some rate, typically 8000 times per second (8 KHz), and the resulting voltage samples are converted into a digital representation, typically 8-bit "$\mu$-law" or "A-law" encoding. The resulting sequence of bits (8000 times 8, or 64K bits/sec) is called the Pulse Code Modulation (PCM) representation of the original voice signal. The digital PBX transports and switches the PCM signals from place to place within the PBX system. Eventually, the PCM signals are converted back into an analog voice signal for a person to hear.

The PCM signals are carried on the bus 40 during particular time intervals, or timeslots. Each timeslot can carry the PCM 64K bit/second stream of data so that typically one timeslot is required for each incoming or outgoing voice path. Of course, a timeslot can also be used to carry computer data at rates up to 64K bits per second.

Besides a timeslot bus, the bus 40 has a signaling bus. Besides PCM-encoded voice signals and data signals, a digital PBX switch must also transport and switch signaling or control information associated with individual voice or data ports. For example, for a rotary-dial telephone it is important to know that the handset has been taken "off-hook," that a digit has been dialed, and so on. Thus, the PBX switch must have a way of gathering signaling information from individual voice ports, and transporting it to a control unit which acts upon this information by, for example, making voice connections.

Digital PBX switches are often connected in a network with other PBX switches and sources of PCM-encoded voice signals, for example, T1 digital trunk lines. Typically, each digital PBX switch or other PCM source has its own local oscillator which drives a local clock to provide an 8 KHz reference frequency for PCM sampling. However, the frequencies of the local oscillators may be different, albeit by amounts as small as 10 to 200 parts per million (ppm).

In a network environment, it is desirable to synchronize all PBX switches to a single 8 KHz reference clock, so that one PBX switch does not generate PCM signals faster than another switch. For example, if there were a 125 ppm difference in clock frequencies, one PBX switch would generate one PCM sample signal per second more than the other switch could absorb.

Thus, a PBX switch should provide a means of synchronizing its clock with some "master" clock source. In a typical PBX switch, this is done through costly, dedicated packaging and cabling arrangements that simply replace the local clock with a clock which is synchronized to a master clock source.

Another possible solution is a digital phase-locked loop (DPLL) circuit to synchronize the local clock with a second clock. However, a problem with DPLLs is that the local clock in following the second clock may require the circuits of the PBX to quicken their response time beyond their limits.

Furthermore, in prior art solutions of synchronizing the local clock, timing corrections can occur at any time. If these corrections are made while the PBX switch is performing some function, the chances of miscommunication are increased.

All these prior art clock synchronization solutions are localized. The signals of the second clock must be brought from the line card coupled to the second clock source to the central control module of the PBX, which bears the local clock and performs the synchronization. This requires the increased expense of separate and dedicated cabling between the control module and each of the line cards which may require synchronization.

The present invention solves or substantially mitigates these problems. The costly solution of dedicated packaging and cabling arrangements is avoided. Rather, the present invention provides for the synchronization of the local clock with a second clock without the problem of prior art DPLLs of requiring circuits to respond in times beyond their limits. Synchronization occurs at specific times to lower the chances of miscommunication. Clock synchronization in accordance with the present invention is distributed to allow any module in a PBX switch to force the local clock of the switch to adjust its frequency. This is done without the separate, dedicated modules and cabling for localized clock synchronization.

SUMMARY OF THE INVENTION

The present invention provides for a clock synchronization system in a digital data switching system having a local clock for generating timing signals at a frequency greater than a nominal frequency, a circuit unit coupled to the local clock for lowering the local clock frequency, and a comparator coupled to the local clock for activating the lowering unit when the comparator is coupled to a second clock operating at substantially the nominal frequency so that the local clock frequency is lowered to synchronize with the second clock.

When the digital data switching system is a digital PBX switch having one or more line card modules and a central control module, the present invention provides for the local clock and the lowering circuit in the central control module and the comparator means in one or more of the line card modules so that the clock synchronization system is distributed.

In this system the comparator in one or more of the line card modules communicates to the lowering circuit over a single signal line.

DETAILED DESCRIPTION OF THE DRAWINGS

The present invention is described hereinafter in the context of a digital PBX switch. However, it can readily be applied to other digital data switching systems, such as central office switching systems in telephone networks and digital T1 carrier systems.

FIG. 1 shows the general organization of a digital PBX switch. The PBX switch has a central control module 41 connected to a number of line card modules 42A–42D by a bus 40. Each of the line card modules is connected to terminals, such as telephone sets or perhaps computers receiving or sending data. The communication lines from the line card modules to the terminals are indicated by the lines 43A–43C. Additionally, the PBX switch may also be coupled to other PBX switches or to the outside world through trunk lines, symbolized by broad communication line 43D.

The bus 40 carries all the electrical signals between the line card modules 42A–42D and the central control module 41. The bus 40 includes a timeslot data bus for carrying data signals between the various modules and a signaling bus for carrying signaling information between the central control unit 41 and the line card modules 42A–42D. Additionally, the bus 40 has lines carrying clock signals for the proper timing and operation of the PBX switch.

Figure 2:
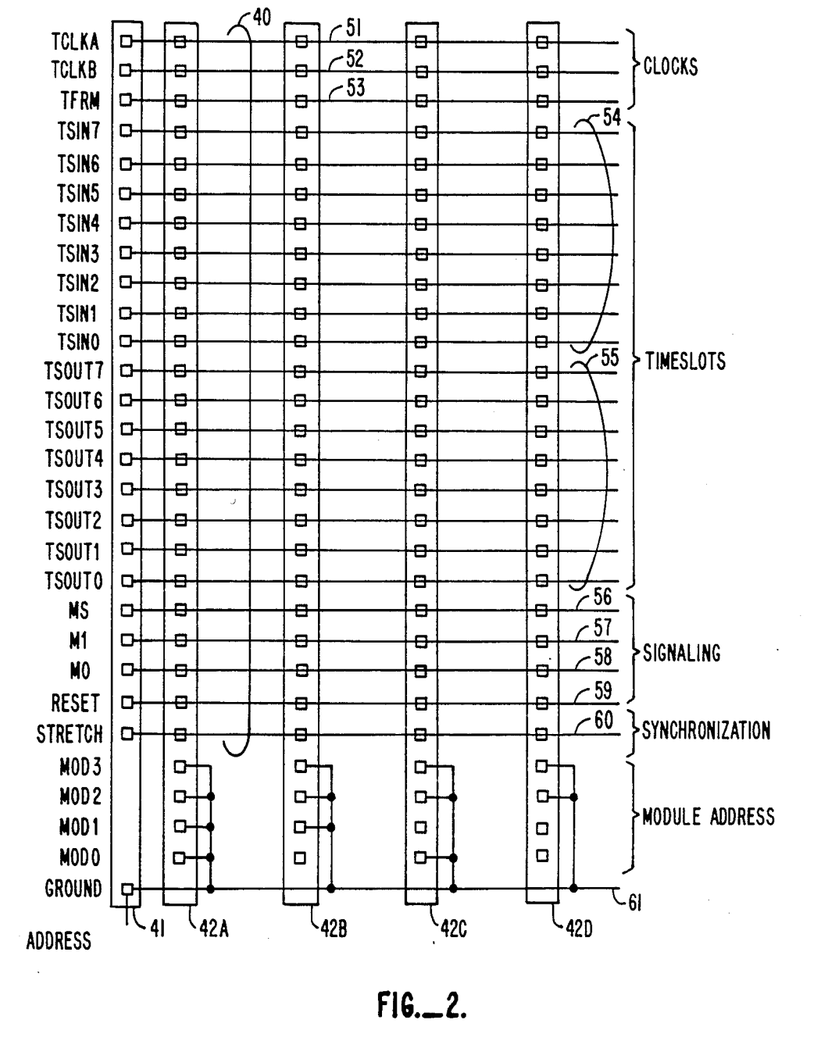
FIG. 2 illustrates the data and signaling buses of a digital PBX switch.

Such a bus 40 is detailed in FIG. 2. The particular bus shown is disclosed in U.S. Ser. No. 607,999, entitled "Digital Timeslot and Signaling Bus in a Digital PBX Switch," filed May 7, 1984 by the present inventor and Samuel F. Wood, and assigned to the present assignee. The timeslot data bus 40 has two sets of signal lines, a set 54 carrying data signals from line card modules 42A–42D into the central control module 41 and a set 55 which carries data signals from the central control module 41 to line card modules 42A–42D. The signaling bus has four lines 56–59. Finally, the bus 40 has clock signal lines 51–53 which carry the timing signals generated from the central control module 41 to the line card modules 42A–42D.

As explained in the above-referenced patent application, the lines 51, 52 carry the timeslot signals (TCLKA or TCLKB) to communicate the PCM encoded voice signals on the timeslot data bus 54, 55. As required, these timeslot signals have a basic 2.048 MegaHertz (MHz) frequency with a 488 nanosecond period. The line 55 carries a framing signal which is active for one TCLKA (or TCLKB) clock period every 125 microseconds, or for one out of every 256 TCLKA or TCLKB periods. The 125 $\mu$sec interval between successive TFRM pulses is called a frame and is standard with $\mu$- or A-PCM.

These clock signals are generated by a local clock circuit located on the central control module 41. These clock signals are placed on the clock lines 51–53 of the bus 40.

In order to create internal and external clock signals with appropriate duty cycles, the local clock circuit on the central control module has a frequency of 12 times the bus frequency of 2.048 MHz, or 24.576 MHz. To achieve the ability to synchronize the timeslot clock signals (and in particular, the TFRM clock) with other clocks external to the PBX system, the central control module must provide a phase-lock loop capability.

In the prior art, phase-locking is obtained by expensive and sensitive analog phase-locked loops. This requires dedicated modules and cabling for clock distribution and synchronization.

The present invention contains a digital phase-locked loop (DPLL) with some unique characteristics:

In a traditional DPLL, the local oscillator runs at the nominal frequency, so that locking requires sometimes stretching, sometimes shrinking the derived clock signals (i.e., both decreasing and increasing the clock frequency). In the present invention, the local oscillator runs 160 ppm faster than the nominal clock frequency, that is, at 24.580 MHz. Thus, to achieve phase-lock, it is only necessary to stretch the derived clock (i.e., decrease the clock frequency).

In the present invention, a stretch of the derived clock increases its period by one period of 24.580 MHz, or about 40 ns. Only one stretch per 125 $\mu$sec frame is allowed. This yields a total adjustment range of about 320 ppm. Thus, by never stretching, a frequency 160 ppm greater than nominal is achieved; by always stretching, a frequency 160 ppm less than nominal is achieved. With intermediate cases of sometimes stretching and sometimes not stretching, the present invention can synchronize with any frequency within about 160 ppm of the nominal frequency. More precisely, the synchronization or lock range is +0, −320 ppm of the local oscillator. The local oscillator itself may not be precisely 160 ppm faster than nominal.

The fact that the present invention only requires stretching of the derived clock signals is important. The logic circuits that run off the derived clock are never required to run faster than their nominal clock frequency plus 160 ppm. With a traditional DPLL, in the event of a shrink of derived clock period, the logic circuits which normally run at 2.048 MHz (488 ns clock period—the local oscillator divided by 12) occasionally see clock periods of 447 ns (local oscillator divided by 11). Even worse, the high-speed timeslot interchange circuits which normally run at 8.192 MHz (122 ns clock period—local oscillator divided by 3) occasionally see clock periods of 81 ns (local oscillator divided by 2). Thus, the high speed data must occasionally be processed 33% faster than the nominal frequency. This forces a design which can handle the worst case possibility. At the very least, this requires the use of more expensive circuit components.

Another unique characteristic of the present invention is that in a traditional DPLL, the phase of the derived clock is compared with that of a reference clock in the same module to determine the necessary phase adjustments (stretching and/or shrinking the derived clock). Therefore, the reference clock signal must somehow be delivered to the module containing the local oscillator. In contrast, the phase comparison function in the present invention is distributed. Any module may command the central control module to stretch the derived clock, by asserting a STRETCH signal on the line 60 (FIG. 3).

Yet another unique characteristic of the present invention, compared with an analog phase locked loop, is that the present invention maintains the phase of the local clock very tightly within 40 ns of the phase of the reference clock. Those skilled in the art may appreciate that while a traditional analog phase locked loop can adequately maintain the phase difference between the local clock frequency and the reference clock frequency, this phase difference can vary by a much wider range, up to 180°, or 62.5 μsec in the present case.

The method of distributing the phase comparison function in the present invention is essential to the overall invention goals of a universal bus with parallel bus wiring (no special cables or dedicated positions for clock distribution or synchronization). The above-referenced patent application discusses the desirability of a universal bus.

Figure 3:
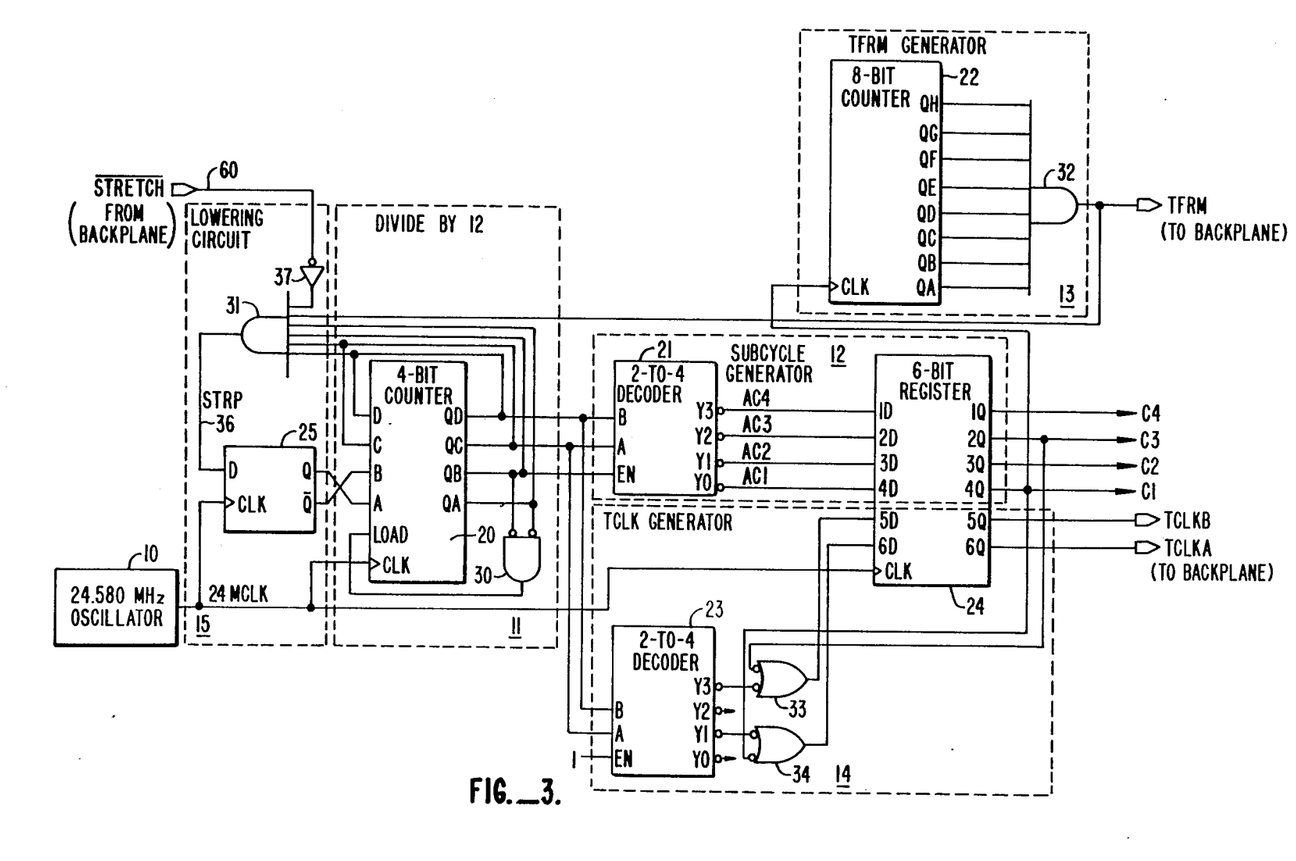
FIG. 3 shows the local clock and units connected to the local clock for generating various timing signals for a PBX switch according to the invention.

The local clock is detailed diagrammatically in FIG. 3. The local clock has a Divide By 12 block 11, a Subcycle Generator block 12, a TFRM Generator block 13 and a TCLK Generator block 14. The Divide By 12 block 11 accepts the periodic signals of an oscillator 10 and normally generates 12 timing states from the oscillator signals before starting over again. The Subcycle Generator block 12, the TFRM Generator block 13 and TCLK Generator block 14 are coupled together to Divide By 12 block 11; each block 12, 13, 14 generates different timing signals. The Subcycle Generator signals are useful for internal clock signals in the control module. The TFRM Generator and TCLK Generator signals are the TFRM and timeslot clock signals respectively for the timing operation of the transfer of the PCM and computer data signals in the digital PBX.

Besides these blocks 11–14, the local clock has attached to a lowering circuit 15 which is closely connected to the Divide By 12 block 11. Under certain conditions to be discussed later, the lowering circuit 15 forces the block 11 to generate 13 timing states to slow the local clock. The lowering circuit 15 helps adjust the timing signals of the local clock to that of a second clock.

The Divide By 12 block 11, which receives a 24.580 MHz signal from the local oscillator 10, has a four bit counter 20 and a NOR gate 30. The closely connected lowering circuit has a flip-flop 25, an AND gate 31 and an inverter 37. The output terminals of the flip-flop 25 are connected to the A and B input terminals of the counter 20. The NOR gate 30 has its inverted input terminals connected to the QA, QB output terminals of the counter 20, while the output terminal of the gate 30 is connected to the LOAD terminal of the counter 20. The AND gate 31 has part of its input terminals connected to the counter QA-QD output terminals.

The counter 20 increments itself on the rising edge of a clock signal from the oscillator 10. However, when the output signal of the NOR gate 30 is "1", the counter 20 accepts the signals present at the input terminals A–D at the rising edge of the clock signal.

The counter 20 is loaded when the QA and QB output terminals are both 0, resulting in a 1 logic signal at the output terminal of the NOR gate 30. Since the output signal of the logic gate 31 of the lowering circuit 15 is normally 0, the Q and $\overline{Q}$ output terminal signals are normally 0 and 1, respectively. (The conditions under which the output signal of the logic gate 31 is 1 are discussed later.) The Q and $\overline{Q}$ terminals are connected respectively to the A and B input terminals of the counter 20.

In contrast, the C input terminal is connected back to the QC output terminal of the counter 20. The D input terminal is similarly connected to the QD output terminal. The result is that each time the four bit counter 20 reaches a number in the form of XX00, the counter 20 skips the next number (XX01) and goes to the next number after that (XX10). In hexadecimal, the counter 20 therefore counts 0, 2, 3, 4, 6, 7, 8, A, B, C, E, F and then returns back to 0. The four bit counter 20 counts 12 states in normal operation in 12 clock cycles from the oscillator 10. Table I shows the output signal states of the counter 20 and the Divide B 12 block 11.

TABLE I

| Without STRETCH signal D = 0, Q = 0, $\overline{Q}$ = 1 | | | | | |
|---|---|---|---|---|---|
| QD | QC | QB | QA | Hexadecimal | |
| 0 | 0 | 0 | 0 | 0 | |
| 0 | 0 | 1 | 0 | 2 | |
| 0 | 0 | 1 | 1 | 3 | |
| 0 | 1 | 0 | 0 | 4 | |
| 0 | 1 | 1 | 0 | 6 | |
| 0 | 1 | 1 | 1 | 7 | |
| 1 | 0 | 0 | 0 | 8 | |
| 1 | 0 | 1 | 0 | A | |
| 1 | 0 | 1 | 1 | B | |
| 1 | 1 | 0 | 0 | C | |
| 1 | 1 | 1 | 0 | E | |
| 1 | 1 | 1 | 1 | F | |

TABLE IA

| With STRETCH signal D = 1, Q = 1, $\overline{Q}$ = 0 | | | | |
|---|---|---|---|---|
| QD | QC | QB | QA | Hexadecimal |
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 1 | 0 | 6 |
| 0 | 1 | 1 | 1 | 7 |
| 1 | 0 | 0 | 0 | 8 |
| 1 | 0 | 1 | 0 | A |
| 1 | 0 | 1 | 1 | B |
| 1 | 1 | 0 | 0 | C |
| 1 | 1 | 1 | 0 | E |
| 1 | 1 | 1 | 1 | F |

Signals from the QC and QD output terminals of the counter 20 are received by a decoder 21 of a Subcycle Generator block 12. The decoder 21 is enabled by a 1 at the output terminal QB of the counter 20. The decoder 21 translates the four possible states on the A and B input terminals to a signal on one of four inverted output terminals Y0–Y3. Table I shows the values of the signals received at the A and B inputs from the four bit counter 20. As shown in Table I the QB output of the counter 20 is 0 at the hexadecimal values of 0, 4, 8 and C. For these output values of the counter 20, the decoder 21 is not enabled so that the outputs Y0-Y3 are 0. Hence, the inverted values AC1-AC4 are 1 at these points.

For the other output values of the counter 20, the QB output in Table I is 1, which enables the decoder 21 to decode the values at the A and B input terminals, the QC and QD output terminals of the counter 20. These decoded values Y0-Y3 and inverted AC1-AC4 signals are shown in Table II.

TABLE II

| Hexadecimal | B | A | Y3 | Y2 | Y1 | Y0 | AC4 | AC3 | AC2 | AC1 |
|---|---|---|---|---|---|---|---|---|---|---|
| 0 | 0 | 0 | 0 | 0 | 0 | 0 | 1 | 1 | 1 | 1 |
| 2 | 0 | 0 | 0 | 0 | 0 | 1 | 1 | 1 | 1 | 0 |
| 3 | 0 | 0 | 0 | 0 | 0 | 1 | 1 | 1 | 1 | 0 |
| 4 | 0 | 1 | 0 | 0 | 0 | 0 | 1 | 1 | 1 | 1 |
| 6 | 0 | 1 | 0 | 0 | 1 | 0 | 1 | 1 | 0 | 1 |
| 7 | 0 | 1 | 0 | 0 | 1 | 0 | 1 | 1 | 0 | 1 |
| 8 | 1 | 0 | 0 | 0 | 0 | 0 | 1 | 1 | 1 | 1 |
| A | 1 | 0 | 0 | 1 | 0 | 0 | 1 | 0 | 1 | 1 |
| B | 1 | 0 | 0 | 1 | 0 | 0 | 1 | 0 | 1 | 1 |
| C | 1 | 1 | 0 | 0 | 0 | 0 | 1 | 1 | 1 | 1 |
| E | 1 | 1 | 1 | 0 | 0 | 0 | 0 | 1 | 1 | 1 |
| F | 1 | 1 | 1 | 0 | 0 | 0 | 0 | 1 | 1 | 1 |

The inverted values AC1-AC4 are received by the first four input terminals of a six bit register 24. The register 24 is shown partially belonging to the Subcycle Generator block 12 and partially belonging to the TCLK Generator block 14 since the register 24 functions in both blocks 12, 14. The register 24 is controlled by the clock signal from the oscillator 10 and accepts new data at each clock cycle. The received data at the 1D-4D input terminals appear as output signals C1-C4 at the terminals 1Q-4Q. These output signals C1-C4 are used for the internal working operations of the digital PBX switch.

The TCLK generator block 14, which generates the time slot signals for the PBX switch, has a decoder 23 which is likewise connected to the QC and QD output terminals of the counter 20. However, unlike the decoder 21, the decoder 23 is always enabled so that the QC and QD output terminal signals are always received by the decoder 23. The Y0 and Y2 output terminals are not used. The inverted signal of the Y1 output terminal is received by a NAND gate 34 and the inverted output signal of the terminal Y3 is received by a NAND gate 33. Table III shows the operation of the TCLK Generator 14.

TABLE III

| Hexadecimal | B | A | Y3 | Y1 | C1 | $\overline{Y1 + C1}$ | C3 | $\overline{Y3 + C3}$ |
|---|---|---|---|---|---|---|---|---|
| 0 | 0 | 0 | 0 | 0 | 1 | 0 | 1 | 0 |
| 2 | 0 | 0 | 0 | 0 | 1 | 0 | 1 | 0 |
| 3 | 0 | 0 | 0 | 0 | 0 | 1 | 1 | 0 |
| 4 | 0 | 1 | 0 | 1 | 0 | 1 | 1 | 0 |
| 6 | 0 | 1 | 0 | 1 | 1 | 1 | 1 | 0 |
| 7 | 0 | 1 | 0 | 1 | 1 | 1 | 1 | 0 |
| 8 | 1 | 0 | 0 | 0 | 1 | 0 | 1 | 0 |
| 10 | 1 | 0 | 0 | 0 | 1 | 0 | 1 | 0 |
| 11 | 1 | 0 | 0 | 0 | 1 | 0 | 0 | 1 |
| 12 | 1 | 1 | 1 | 0 | 1 | 0 | 0 | 1 |
| 14 | 1 | 1 | 1 | 0 | 1 | 0 | 1 | 1 |
| 15 | 1 | 1 | 1 | 0 | 1 | 0 | 1 | 1 |

It should be noted that in FIG. 3, the NAND gates 33, 34 are shown as OR gates with inverted input terminals. By DeMorgan's theorem, these gates are equivalent. Given that the decoder 23 has inverted output terminals, the OR gates 33, 34 are used to better illustrate the logic of the TCLK Generator block 14.

The NAND gates 33, 34 also receive the inverted signals of the output signals C3 and C1 respectively. The result is that the NAND gate 33 has a high output pulse for four consecutive clock cycles of the oscillator 10 for the hexadecimal values B, C, E and F of the counter 20. Likewise, the NAND gate 33 has a high output pulse of four clock cycles for the hexadecimal values 3, 4, 6 and 7 of the counter 20. These output signals from the NAND gates 33, 34 are received by the input terminals 5D and 6D of the register 24. These signals appear from the register 24 as the timeslot signals TCLKA and TCLKB of the digital PBX switch.

Figure 4:
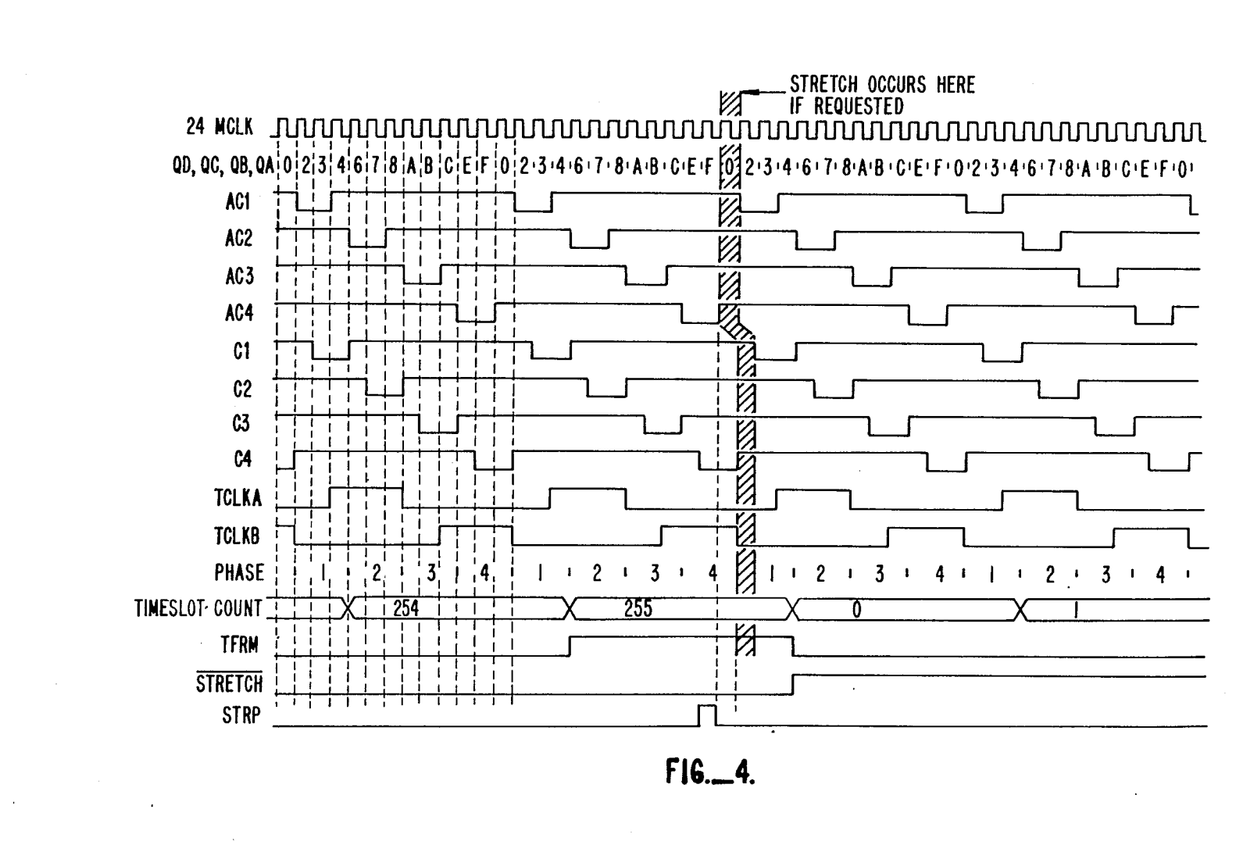
FIG. 4 represents the timing operations of the local clock and units shown in FIG. 3.

A TFRM Generator block 13 has an 8-bit counter 22 which has all eight QA-QH output terminals connected to an AND gate 32. The counter 22 is incremented at the rising edge of the clock pulse of the C1 output signal from the register 24. As shown in FIG. 4 the C1 output signal rises every 12 clock cycles of the oscillator 10 and as the value of the output counter 20 switches from the hexadecimal value 4 to 6. Hence every 12 clock cycles of the oscillator 10 the 8-bit counter 22 is incremented by 1. Since the AND gate 32 is connected to all eight output terminals of the counter 22, it has a "1" on all eight input terminals after the C1 output signal has repeated itself 256 times. As shown in FIG. 4 the TFRM signal goes high at the 256th clock cycle, indicated by the time clock period 255.

The output terminal of the AND gate 32 is also connected back to an input terminal of the AND gate 31 of the lowering circuit 15. The AND gate 31 is also connected to an inverter 37, which inverts the active low STRETCH signal on the line 60.

When an active low STRETCH signal appears on the line 60, a 1 signal is sent to the AND gate 31 from the inverter 37. It is then possible for the AND gate 31 to generate a logic 1. This occurs when the TFRM signal from the AND gate 32 is also 1 and when QA-QD are all high so that the hexadecimal output signal of the counter 20 is F. Then the STRP output signal of the AND gate 31 on the line 36 is 1. This causes the flip-flop 25 to produce a 1 output signal at the output terminal Q and a 0 output signal at the output terminal $\overline{Q}$. The Q, $\overline{Q}$ signals are received by the input terminals A, B of the counter 20 in the Divide By 12 block 11. The counter 20 now has an additional cycle. Rather than counting from 0 and jumping to 2, the counter 20 increments itself from 0 to 1, and then to 2. This is shown in Table IA. Similarly, an extra state would appear in Tables II and III. The result is that the Divide By 12 block 11 now divides the oscillator 10 signals by 13. It should be noted again that this STRETCH operation shown in FIG. 4, appears only at the end of the 256th timeslot count. The timeslot 255 is stretched by one more cycle of the oscillator 10. For the other timeslot counts and output signals, the timing operations remain the same.

Because the STRETCH function operates on the local clock only at the end of the 256th timeslot count, the remaining 255 timeslots are unaffected by the adjustment of clocks. By using these 255 timeslots for standard communication and reserving the last time slot for synchronization, the chances of miscommunication are reduced. In prior art systems, a synchronization operation could occur at any time in a time frame with the consequent possibility of miscommunication.

Figure 5:
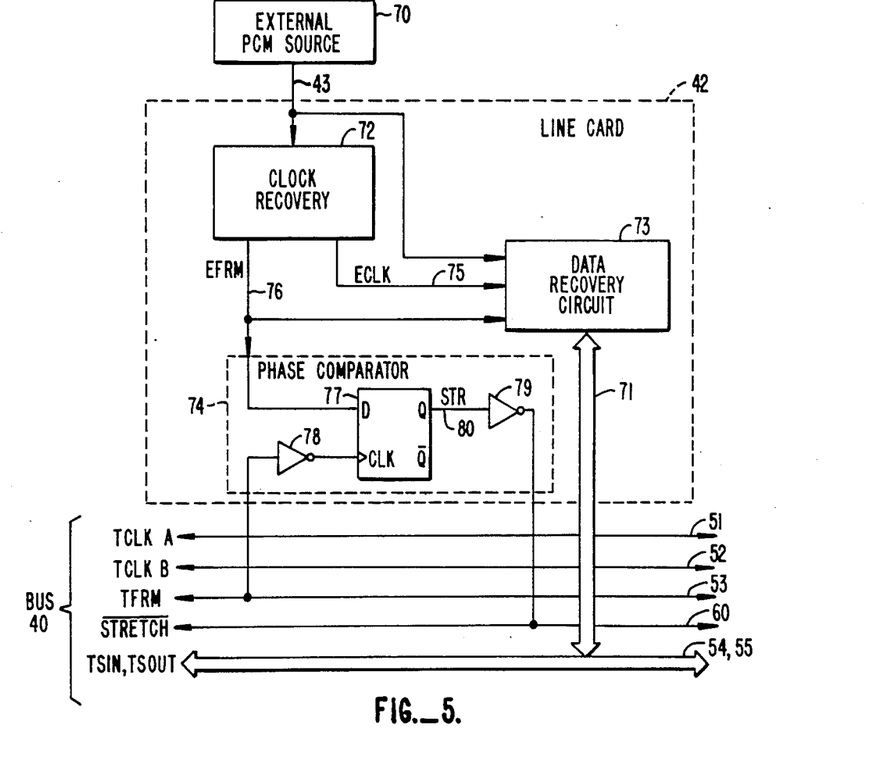
FIG. 5 shows the phase comparator circuit for generating the STRETCH signal to synchronize the local clock with a second clock.

A simple phase comparator circuit 74 which may be located on one or more of the line card modules 42A–42D is shown in FIG. 5. The phase comparator circuit 74 on an arbitrary line card module 42 generates the STRETCH signal on the line 60 to slow the TCLKA, TCLKB, and TFRM signals on the lines 51–53 entering that line card module.

In FIG. 5, an external source 70 delivers one or more PCM signals over a line 43 to the line card 42. In the preferred embodiment, the external source 70 is another PBX or a central office, and the PCM signals are that of a single T1 or other serial transmission line.

A clock recovery circuit 72 generates a timeslot clock signal ECLK 75 on a line 75 and a frame signal EFRM on a line 76 from the incoming PCM signals. The design of clock recovery circuits is well understood by those skilled in the art. There may even be no clock recovery circuit 72 at all if the external PCM source 70 includes explicit timeslot ECLK and frame EFRM signals in the PCM signals it is transmitting. In any case, the recovered ECLK and EFRM signals are coupled by the lines 75, 76 to a data recovery circuit 73 which extracts PCM data from the incoming PCM signal and delivers the PCM data to the backplane TSIN and TSOUT buses 54, 55 by lines 71. The design of data recovery circuits, such as that described, is also well understood by those skilled in the art.

The phase comparator circuit 74 receives the EFRM signals on line 76, and the TFRM signal on line 53 to produce an output signal for the backplane STRETCH line 60. The recovered EFRM signal line 76 is connected to the D input terminal of a flip-flop 77. The local TFRM signal line 53 is coupled through an inverter 78 to the CLK input terminal of the same flip-flop 77. The Q output terminal of flip-flop 77 is connected through an inverter 79 to the backplane STRETCH line 60. In the preferred embodiment, the inverter 79 is a TTL (Transistor-Transistor Logic) inverter with opencollector output, such as Texas Instruments part no. 74LS06. When a STRETCH signal is commanded, the signal on the STR line 80 to the inverter 79 is 1 and the output signal to the STRETCH line 60 is "low" or 0; when no STRETCH is commanded, the signal on the STR line 80 is 0, and the signal to the STRETCH line 60 "floats." In this way, many line cards may be coupled to the same STRETCH line 60; any of these line cards may command STRETCH to take place by driving the line 60 low.

The circuit shown in FIG. 5 may be modified so that a particular line card may be enabled or disabled to make STRETCH commands. The open-collector inverter 79 is replaced by an open-collector 2-input NAND gate, whose second input terminal receives a "STRETCH-ENABLE" signal. When the "STRETCH-ENABLE" signal is 1, the line card may command a STRETCH operation to take place according to the state of the STR signal on the line 80; when the STRETCH-ENABLE signal is 0, the line card is disabled from commanding any STRETCHES, regardless of requirements indicated by signal STR 80. The source of the "STRETCH-ENABLE" signal is determined by overall system requirements. It could, for example, be generated on a line card in response to commands received from the central control module 41 over the signaling bus 56–59.

Figure 6:
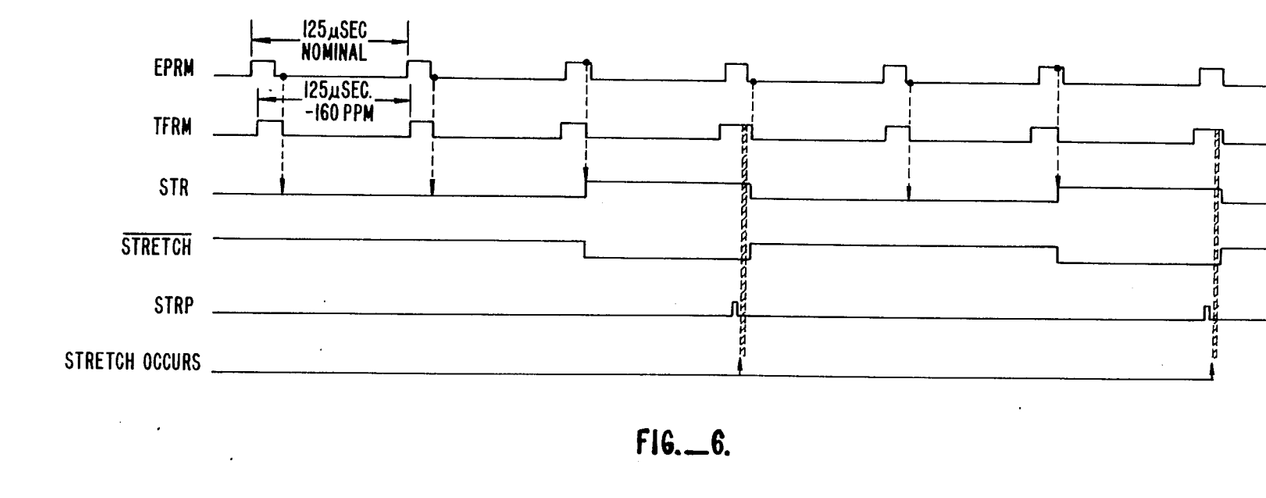
FIG. 6 illustrates the timing of the phase comparator circuit shown in FIG. 5.

The operation of the phase comparator circuit 74 is shown by the timing diagram in FIG. 6. The goal of phase comparison is to keep the backplane TFRM signal on the line 53 in phase with the recovered external EFRM frame signal on the line 76. At the start of operation in FIG. 6, the phase of the TFRM signal slightly lags that of the EFRM signal. In this case, as shown for the first two EFRM and TFRM signal pulses, the flip-flop 77 in FIG. 5 produces an STR output signal of 0. This results in a STRETCH signal of 1 on the backplane, and no STRETCH is requested or occurs.

Because the frequency of the local oscillator is faster than the nominal frequency, the unadjusted period between TFRM pulses is shorter than the period between EFRM pulses, and so the phase of TFRM signal eventually catches up with and leads that of the EFRM signal. This is the situation at the third EFRM and TFRM signal pulses in FIG. 6. In this case, the flip-flop 77 in FIG. 5 produces an STR output signal of 1, which asserts the STRETCH signal on the backplane line 60. A pulse is generated on the STRP signal line in the Divide By 12 block 11 in the central control module 41 during the *next* TFRM pulse, causing a STRETCH to occur. Thus, during the fourth TFRM pulse in FIG. 6, all of the central control and backplane clock signals, including TFRM itself, are stretched by one cycle of the local oscillator 10, about 40 ns in the preferred embodiment shown in FIGS. 3 and 4.

In the example of FIG. 6, the 40 ns STRETCH during the fourth TFRM pulse is sufficiently long so that at the end of the fourth and fifth TFRM pulses the comparator flip-flop 77 in FIG. 5 once again produces an STR output signal of 0. No STRETCH occurs during fifth and sixth TFRM pulses. However, by the sixth TFRM pulse, the phase of TFRM is once again leading that of EFRM and the STR signal is set to 1. Another STRETCH occurs during the seventh TFRM pulse. Operation continues in this way, with STRETCH operations occurring or not occurring at a rate that precisely compensates for the difference between the incoming EFRM signal frequency and the unadjusted TFRM signal frequency. This operation maintains the phase of the EFRM and TFRM signals within 40 ns of each other, as measured at their respective falling edges.

It should be noted that the STRETCH signal on the backplane line 60 is asserted just after a TFRM signal changes from 1 to 0. This is significant because, referring to FIGS. 3 and 4, it is apparent that the Divide By 12 block 11 in the central control module 41 receives the STRETCH signal 60 on the line before the 1-to-0 transition of the next TFRM signal. The STRETCH request on the line 60 is not accepted until almost one full frame after the signal was generated, i.e., a STRETCH operation occurs during the fourth TFRM pulse after the STRETCH signal at the end of the third TFRM pulse in FIG. 6. This is desirable because it maximizes the settling time for the Q output of the comparator flip-flop 77, which is subject to metastable behavior due to the necessarily asynchronous timing relationship of the signals on its D and CLK input terminals. However, if the metastable settling time can be guaranteed to be somewhat less that the width of the TFRM pulse, the circuit can be modified to operate on the rising edge of TFRM pulse, by connecting the D input of the flip-flop 77 in FIG. 5 directly to the TFRM signal on the line 53 without the inverter 78, and generating the STR signal from the $\overline{Q}$ output terminal of the flip-flop 77. In this way, the STRETCH occurs at the end of the same TFRM pulse in which the phase comparison is made.

If there is no line card module capable of adjusting the backplane clocks through the STRETCH mechanism, then the central control module 41 can itself assert the STRETCH signal on alternating 125 μsec frames. This reduces the backplane clock frequencies by about 160 ppm, bringing them back to their nominal value.

The phase comparison circuit described in FIGS. 5 and 6 is the simplest possible phase comparator for a digital phase locked loop. It will be understood by those skilled in the art that almost any type of phase comparator may be installed in the place of the simple phase comparator 74. For example, U.S. Pat. No. 4,216,544, entitled "Digital Clock Recovery Circuit," granted on Aug. 5, 1980 to Alberto Boleda and the present inventor, and assigned to Northern Telecom Limited of Montreal, Canada, discloses a more sophisticated digital clock recovery circuit in which the phase comparator inhibits phase adjustment when the relative phase of the signals is within certain limits, and in which phase adjustment takes place only after several indications that one signal is leading or lagging the other, to prevent any adjustments due to noise.

Likewise, the Divide-By-12 block 11 in FIG. 3 has a fairly limited capability as a logic controlled oscillator. It can only stretch the clock by one local oscillator period at a time. Those skilled in the art understand that a more sophisticated circuit could be used to provide the capability of stretching the clock by one or more local oscillator periods according to command, in order to provide quicker phase adjustments when the local frame signal TFRM is grossly out of phase with the recovered frame signal EFRM. Of course, such an arrangement requires a more sophisticated phase comparator than comparator 74 in FIG. 6 and the coupling of a control signal with more than two states (STRETCH or NO STRETCH) from the line card module 42 to the central control module 41. Such coupling may be achieved with multiple signal lines in the bus 40, or by time-division multiplexing a single STRETCH line.

Of course, the present invention may be modified without changing the concept of the present invention. For instance, the digital logic above may be inverted. Hence, although the foregoing invention has been described in some detail by way of illustration and example for purposes of clarity and understanding, it will be obvious that certain changes and modifications may be practiced within the scope of the appended claims.

What is claimed is:

1. A clock synchronization system in a a digital PBX switch having one or more line card modules and a central control module, comprising
   a first clock for generating timing signals at a first clock frequency greater than a nominal frequency, said first clock in said central control module,
   a circuit coupled to said local first clock for lowering said first clock frequency, said lowering circuit in said central control module, and
   comparator means having a first input coupled to said first clock, and having an output coupled to said lowering circuit for activating said lowering circuit when a second input of said comparator means is coupled to a second clock, said second clock operating at substantially said nominal frequency, to lower said first clock frequency to synchronize said first clock frequency with said second clock, said comparator means in said one or more of said line card modules to distribute said clock synchronization system.

2. The clock synchronization system of claim 1 wherein said comparator means is coupled to said lowering circuit by a single signal line.

3. The clock synchronization system of claim 2 wherein said lowering circuit can be activated at only certain spaced intervals of said timing signals.

4. The clock synchronization system of claim 2 wherein said first clock comprises
   a counter having input and output terminals, responsive to signals from an oscillator for incrementing the signal states of said counter cyclically and further responsive to a signal generated by the logical combination of signals from said output terminals for loading signals at said input terminals into said counter cyclically, said counter signal states generating said first clock timing signals; and lowering circuit comprises
   a unit connected to said counter input terminals, said unit nominally setting signals at said input terminals such that said counter skips at least one state as said counter increments and loads, said unit responsive to a signal on said single signal line, setting signals at said input terminals such that said counter does not skip said one state as said counter increments and loads;
   whereby the number of signal states per cycle of said counter is increased in response to said signal on said single signal line to lower said first clock frequency.

5. The clock synchronization system of claim 4 wherein said lowering means further comprises
   means responsive to said first clock timing signals, signals from said counter output erminals terminals and signals on said single signal line for logically combining said signals,
   said unit responsive to said logic combining means so that said unit sets signals at said counter input terminals to avoid skipping said one state at only certain spaced intervals of said timing signals.

6. A clock synchronization system in a digital data switching system having a plurality of module units communicating digital data signals therebetween under the control of a central unit, comprising
   a clock in said central unit for generating first clock timing signals for said module units,
   means in said central unit coupled to said clock for controlling the frequency of said timing signals,
   comparator means in at least one of said module units, said comparator means having a first input coupled to said central unit clock and having an output coupled to said clock controlling means for activating said controlling means when a second input of said comparator means is coupled to a second clock, to synchronize said first clock timing signals with said second clock timing signals.

7. A clock synchronization system as in claim 6 wherein said clock generates said timing signals at a first clock frequency greater than a nominal frequency, and said controlling means synchronizes said first clock timing signals by lowering said first clock frequency.

8. A clock synchronization system as in claim 7 wherein said comparator means in at least one of said units is coupled to said controlling means by a single signal line.

9. The clock synchronization system of claim 7 wherein said first clock comprises
   a counter having input and output terminals, responsive to signals from an oscillator for incrementing the signal states of said counter cyclically and further responsive to a signal generated by the logical combination of signals from said output terminals for loading signals at said input terminals into said counter cyclically, said counter signal states generating said first clock timing signals; and lowering circuit comprises a unit connected to said counter input terminals, said unit nominally setting signals at said input terminals such that said counter skips at least one state as said counter increments and loads, said unit responsive to a signal on said single signal line, setting signals at said input terminals such that said counter does not skip said one state as said counter increments and loads;

whereby the number of signal states per cycle of said counter is increased in response to said signal on said single signal line to lower said first clock frequency.

10. The clock synchronization system of claim 9 wherein said lowering means further comprises means responsive to said first clock timing signals, signals from said counter output erminals and signals on said single signal line for logically combining said signals, said unit responsive to said logic combining means so that said unit sets signals at said counter input terminals to avoid skipping said one state at only certain spaced intervals of said timing signals.

11. A clock synchronization system in a a digital PBX having one or more line card modules and a central control module, comprising a local clock for genrating timing signals at a first clock frequency greater than a nominal frequency for digital data transfer, said local clock in said central control module, means coupled to said clock for adjusting said first clock frequency to only lower said first clock frequency, said adjusting means in said central control module, and comparator means having a first input coupled to said local clock and having an output coupled to said adjusting means for activating said adjusting means when a second input in said comparator means is coupled to a second clock at a second clock frequency, said adjusting means operative only at certain spaced times of said timing signals in response to said comparator means, to adjust first clock frequency for synchronization with said second clock frequency at only certain spaced times, said comparator means in said one or more of said line card modules to distribute said clock synchronization system.

12. The clock synchronization system of claim 11, wherein said comparator means is coupled to said adjusting means by a single signal line.

13. The clock synchronization system of claim 11 wherein said first clock comprises a counter having input and output terminals, responsive to signals from an oscillator for incrementing the signal states of said counter cyclically and further responsive to a signal generated by the logical combination of signals from said output terminals for loading signals at said input terminals into said counter cyclically, said counter signal states generating said first clock timing signals; and lowering circuit comprises a unit connected to said counter input terminals, said unit nominally setting signals at said input terminals such that said counter skips at least one state as said counter increments and loads, said unit responsive to a signal on said single signal line, setting signals at said input terminals such that said counter does not skip said one state as said counter increments and loads;

whereby the number of signal states per cycle of said counter is increased in response to said signal on said single signal line to lower said first clock frequency.

14. The clock synchronization system of claim 13 wherein said lowering means further comprises means responsive to said first clock timing signals, signals from said counter output erminals and signals on said single signal line for logically combining said signals, said unit responsive to said logic combining means so that said unit sets signals at said counter input terminals to avoid skipping said one state at only certain spaced intervals of said timing signals.

* * * * *